US010977735B1

(12) United States Patent
Cardona et al.

(10) Patent No.: US 10,977,735 B1
(45) Date of Patent: Apr. 13, 2021

(54) PROVIDING USER INTERACTION DATA ASSOCIATED WITH A PROPERTY

(71) Applicant: STATE FARM MUTUAL AUTOMOBILE INSURANCE COMPANY, Bloomington, IL (US)

(72) Inventors: Alexander Cardona, Bloomington, IL (US); Dana C. Hunt, Normal, IL (US); Erin Olander, Bloomington, IL (US); John A. Schirano, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 580 days.

(21) Appl. No.: 15/198,959

(22) Filed: Jun. 30, 2016

(51) Int. Cl.
*G06Q 40/08* (2012.01)
*G06Q 50/16* (2012.01)
*G06F 3/0484* (2013.01)

(52) U.S. Cl.
CPC ......... *G06Q 40/08* (2013.01); *G06F 3/04842* (2013.01); *G06Q 50/163* (2013.01)

(58) Field of Classification Search
CPC ... G06Q 40/08; G06Q 50/163; G06F 3/04842
USPC .......................................................... 705/4
See application file for complete search history.

(56) References Cited

U.S. PATENT DOCUMENTS

| | | | | |
|---|---|---|---|---|
| 7,834,883 B2* | 11/2010 | Adams | .................... | G06Q 30/02 345/581 |
| 8,103,445 B2* | 1/2012 | Smith | .................. | G09B 29/007 340/995.14 |
| 9,536,148 B2* | 1/2017 | Gross | .................... | G06T 1/0007 |
| 2001/0052123 A1* | 12/2001 | Kawai | .................... | H04H 20/91 725/36 |
| 2002/0054027 A1* | 5/2002 | Porter | .................... | G06F 3/044 345/173 |
| 2009/0031246 A1* | 1/2009 | Cowtan | .................. | G06Q 30/00 715/786 |
| 2009/0132316 A1* | 5/2009 | Florance | ................ | G06Q 30/06 701/532 |
| 2012/0066074 A1* | 3/2012 | Adams | .................. | G06Q 30/02 705/14.69 |
| 2012/0231424 A1* | 9/2012 | Calman | .................. | G09B 25/04 434/72 |

(Continued)

*Primary Examiner* — Samica L Norman
*Assistant Examiner* — Murali K Dega
(74) *Attorney, Agent, or Firm* — Marshall, Gerstein & Borun LLP

(57) ABSTRACT

A computer-implemented method for providing user interaction data associated with a property is presented. A plurality of dimensions associated with a portion of the property may be determined. Image data associated with the portion of the property may be determined using an image sensor. The plurality of dimensions associated with the portion of the property may be associated with the image data associated with the portion of the property to generate the user interaction data associated with the property. The user interaction data may be provided via a user interface. The user interaction data may allow a user of the user interface to view at least one image of the portion of the property. The at least one image may be based on the plurality of dimensions associated with the portion of the property and the image data associated with the portion of the property.

18 Claims, 7 Drawing Sheets

(56) References Cited

U.S. PATENT DOCUMENTS

| | | | |
|---|---|---|---|
| 2013/0346020 A1* | 12/2013 | Pershing | G01B 21/28 |
| | | | 702/156 |
| 2014/0129366 A1* | 5/2014 | Mudhar | G06Q 50/167 |
| | | | 705/26.4 |
| 2016/0260253 A1* | 9/2016 | Reddy | G06T 7/33 |
| 2016/0300392 A1* | 10/2016 | Jonczyk | G06T 7/536 |
| 2019/0037134 A1* | 1/2019 | Merati | H04N 5/77 |

* cited by examiner

PROVIDING USER INTERACTION DATA ASSOCIATED WITH A PROPERTY

FIELD OF THE DISCLOSURE

The present disclosure generally relates to providing data associated with a property and, more particularly, to a system and method for providing user interaction data associated with a property.

BACKGROUND

Existing techniques for listing a residential property for sale include making images of the interior of the property available online or in print. The images made available are frequently made available in a general collection that contains all images of the interior of the property, or all images of various portions of the interior of the property. The images are viewable by a prospective purchaser from the perspective of, for example, a camera used to capture the images. Typical perspective views, and existing techniques for making property images available in general, have various drawbacks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method for providing user interaction data associated with a property may be provided. The method may include determining, using one or more processors, a plurality of dimensions associated with a portion of the property. The method may also include determining, using an image sensor, image data associated with the portion of the property. The method may additionally include associating, using the one or more processors, (i) the plurality of dimensions associated with the portion of the property with (ii) the image data associated with the portion of the property to generate the user interaction data associated with the property. The method may further include providing, using the one or more processors via a user interface, the user interaction data. The user interaction data may allow a user of the user interface to view at least one image of the portion of the property. The at least one image may be based on the plurality of dimensions associated with the portion of the property and the image data associated with the portion of the property.

In another embodiment, a computing device for providing user interaction data associated with a property may be provided. The computing device may include an image sensor configured to determine image data associated with a portion of the property. The computing device may also include one or more processors and one or more memories coupled to the one or more processors. The one or more memories may include non-transitory computer executable instructions stored therein that, when executed by the one or more processors, cause the one or more processors to determine a plurality of dimensions associated with the portion of the property. The non-transitory computer executable instructions, when executed by the one or more processors, may also cause the one or more processors to associate (i) the plurality of dimensions associated with the portion of the property with (ii) the image data associated with the portion of the property to generate the user interaction data associated with the property. The non-transitory computer executable instructions, when executed by the one or more processors, may additionally cause the one or more processors to provide, via a user interface, the user interaction data. The user interaction data may allow a user of the user interface to view at least one image of the portion of the property. The at least one image may be based on the plurality of dimensions associated with the portion of the property and the image data associated with the portion of the property.

In yet another embodiment, a computer readable storage medium may be provided that includes non-transitory computer readable instructions stored thereon for providing user interaction data associated with a property. The instructions, when executed by one or more computing devices, may cause the one or more computing devices to determine a plurality of dimensions associated with a portion of the property. The instructions, when executed by the one or more computing devices, may also cause the one or more computing devices to determine, using an image sensor, image data associated with the portion of the property. The instructions, when executed by the one or more computing devices, may additionally cause the one or more computing devices to associate (i) the plurality of dimensions associated with the portion of the property with (ii) the image data associated with the portion of the property to generate the user interaction data associated with the property. The instructions, when executed by the one or more computing devices, may further cause the one or more computing devices to provide, via a user interface, the user interaction data. The user interaction data may allow a user of the user interface to view at least one image of the portion of the property. The at least one image may be based on the plurality of dimensions associated with the portion of the property and the image data associated with the portion of the property.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
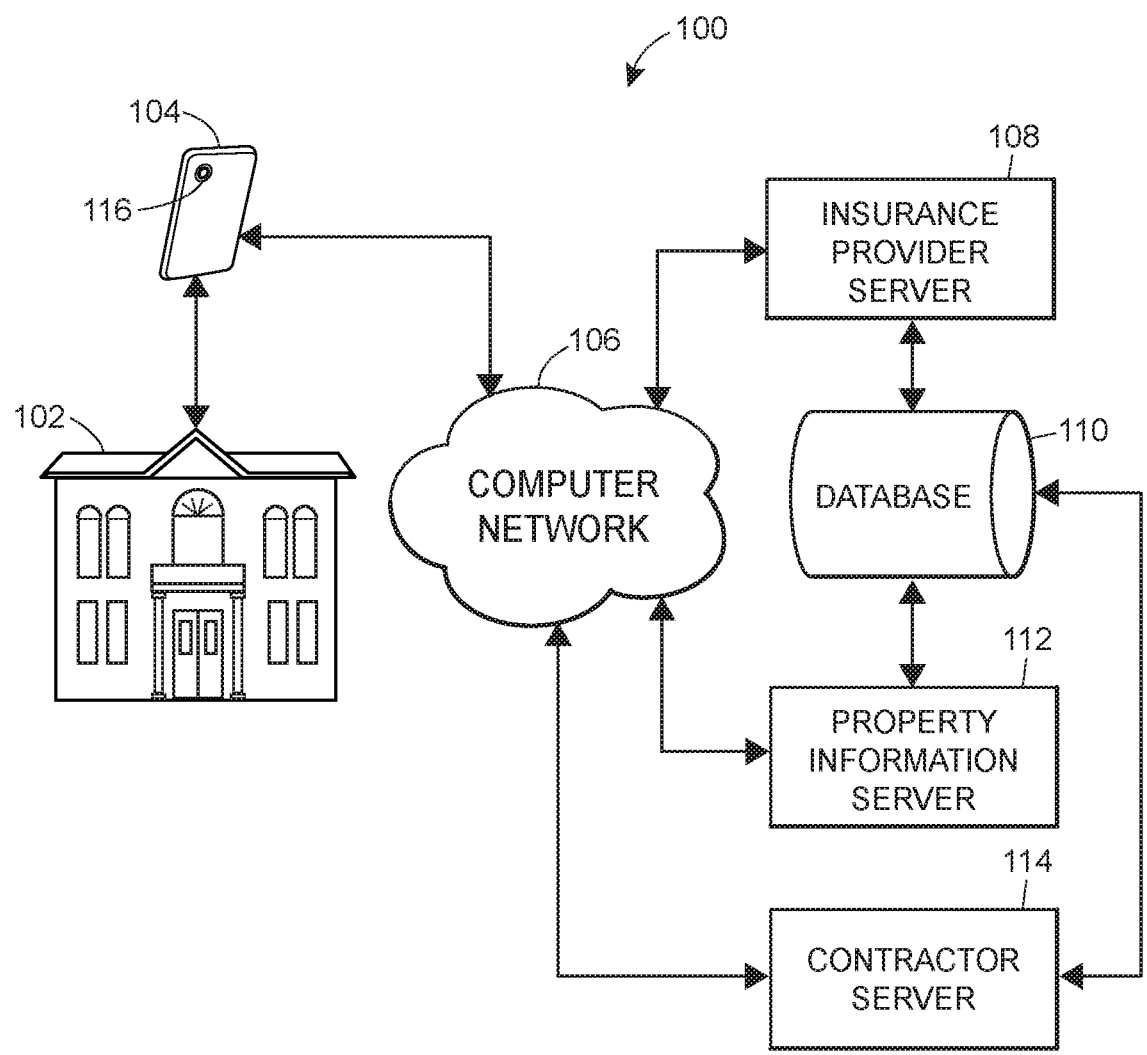
FIG. 1 illustrates an example system for providing user interaction data associated with a property.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

I. EXAMPLE PROVIDING OF USER INTERACTION DATA ASSOCIATED WITH A PROPERTY

The present embodiments relate to, inter alia, a system and method for providing user interaction data associated with a property. More particularly, a plurality of dimensions (e.g., corresponding to wall placement for one or more rooms, an entire floor(s), etc.) associated with a portion of the property (e.g., a portion of a residential property such as a house, townhouse, condominium, etc.) may be determined, such as by one or more processors executing suitable non-transitory computer readable instructions. In some embodiments, the portion of the property may be less than the entire interior of the property and may be, for example, one or more rooms of the property, one or more levels of the property, etc. In other embodiments, the portion of the property may be the entire interior of the property (e.g., all levels of the property), and the plurality of dimensions associated with the portion of the property may thus be, for example, dimensions of all rooms, hallways, etc. of all levels of the property.

The plurality of dimensions associated with the portion of the property may be determined using a position sensor, such as an absolute position sensor or relative position sensor that indicates displacement, for example. In some embodiments, the position sensor may be an image sensor (e.g., a camera or other suitable image sensor) and may sense position by generating image data indicative of the dimensions associated with the portion of the property, for example.

Image data associated with the portion of the property may also be determined, such as by using an image sensor. In some embodiments where the plurality of dimensions associated with the portion of the property is determined using a position sensor, and the position sensor is an image sensor, the position sensor and the image sensor used in determining the image data associated with the portion of the property may be the same sensor. It will be appreciated in light of the teaching and disclosure herein that multiple position sensors and/or multiple image sensors may be implemented as needed and/or desired. The image data may include, for example, data indicative of an interior (e.g., contents, fixtures other than walls (with data indicative of walls being included in data indicative of the plurality of dimensions, in at least some examples), etc.) of the at least one room of the property.

The plurality of dimensions associated with the portion of the property may be associated with the image data associated with the portion of the property (e.g., by the one or more processors associating the plurality of dimensions with the image data in any suitable manner, as further discussed herein) to generate the user interaction data associated with the property. It will be understood in light of the teaching and disclosure herein that the user interaction data associated with the property may more particularly be associated with a portion of the property that is less than the entire interior of the property, or may be associated with the entire interior of the property.

In some embodiments, associating the plurality of dimensions associated with the portion of the property with the image data associated with the portion of the property to generate the user interaction data may include generating the user interaction data to allow the user to view an image(s) corresponding to the portion of the property when the user indicates a selection of the portion of the property via a user interface. For example, the user may indicate the selection of the portion of the property by hovering a mouse pointer over a room of a floor plan displayed via the user interface. Additionally or alternatively, associating the plurality of dimensions with the image data to generate the user interaction data may include generating the user interaction data to allow the user to view an image(s) corresponding to the portion of the property and an indication of the portion of the property. For example, an image(s) of a bedroom may be displayed, and an indication of which bedroom the images correspond to may also be displayed or otherwise provided via the user interface.

In some embodiments, the image data associated with the portion of the property and an indication (e.g., identification) of the portion of the property may be provided to a contractor contacted by a party (e.g., homeowner) associated with the property regarding an improvement (e.g., repair, upgrade or other renovation, etc.) to the portion of the property. In some embodiments, information indicative of an insurance discount for insurance coverage provided for the property may be received based on the party associated with the property contacting the contractor regarding the improvement to the property, and/or based on the party providing the indication of the portion of the property and the associated image data to the contractor.

In some embodiments, the image data associated with the portion of the property may be indicative of a condition of the portion of the property when the portion of the property has sustained a loss covered by an insurance provider (e.g., may be indicative of water damage after flooding). In such embodiments, the image data associated with the portion of the property and indicative of the condition of the portion of the property may be provided to the insurance provider when the loss covered by the insurance provider is reported to the insurance provider.

In some embodiments, at least a second plurality of dimensions associated with at least a second portion of the property (e.g., dimensions of at least one additional room or level) may be determined. At least second image data associated with the at least the second portion of the property may also be determined, such as by the image sensor. The at least the second plurality of dimensions and the at least the second image data may be associated to generate second user interaction data associated with the at least the second portion of the property, and the second user interaction data may be provided via the user interface to allow the user to view an image(s) of the at least the second portion of the property, as further discussed herein.

By providing a system and method that allow user interaction data to be generated and provided based on associating a plurality of dimensions associated with a portion of a property with image data associated with the portion of the property, various advantages are achieved. For example, the user interaction data may allow a user of a user interface to more easily associate images of an interior(s) of a room(s) or other portion(s) of the property with the respective room(s) or other portion(s) of the property and/or an indication(s) of the respective room(s) or other portion(s) of the property. The present embodiments thus provide advantages in contrast to existing systems or methods that provide, for example, images of an interior(s) of a room(s) without clearly indicating the respective room(s) to which such interior(s) correspond (e.g., as in many real estate listings). The present embodiments allow a user to easily distinguish an interior of one room from an interior of another room (or, generally speaking, an interior of one portion of a property from an interior of another portion) while identifying the room(s) or portion(s) being shown. As further discussed herein, the user interaction data may, generally speaking, allow the user to view the image(s) of the room(s) or other portion(s) of the property by viewing a layout view or "blueprint"-type view of the portion(s) of the property in conjunction with the image(s) corresponding to the respective portion(s). Other advantages will be recognized by one of ordinary skill in the art in light of the teaching and disclosure herein.

II. EXAMPLE SYSTEM AND RELATED FUNCTIONALITY

FIG. 1 illustrates an example system 100 for providing user interaction data associated with a property (e.g., a house, a townhouse, a condominium, etc.). The example system 100 may include a property 102, a mobile computing device 104 (which is shown as a mobile phone, but may be any suitable computing device of a user of functionality of the example system 100 described herein), a computer network 106, an insurance provider server 108, a database 110, a property information server 112, and a contractor server 114. The insurance provider server 108 may be a server of or associated with an insurance provider (e.g., provided or used by an insurance provider, or use of which the insurance provider otherwise controls or facilitates). The insurance provider may be associated with the property 102. For example, the insurance provider may be associated with the property 102 because a prospective purchaser of the property 102 may apply for insurance coverage for the property 102 from the insurance provider, and/or because an owner of the property 102 may already have insurance coverage for the property 102 from the insurance provider.

The database 110 may store data relating to parties insured by the insurance provider associated with the insurance provider server 108, such as insured party identification data (e.g., insured party names and contact information); property identification data (e.g., property addresses); dimensions data for dimensions associated with properties (e.g., dimensions data associated with portions of the property 102); image data associated with properties (e.g., image data associated with the portions of the property 102 for which associated dimensions data is stored); user interaction data; and/or any other suitable data, as further described below. The information stored in the database 110 may be retrieved by, for example, the insurance provider server 108, the property information server 112, and/or the contractor server 114, and thus the database 110 may be communicatively coupled to the insurance provider server 108, the property information server 112, and the contractor server 114 as shown in the example of FIG. 1. In some embodiments, various example types of data described above may be stored in another suitable location, such as in a further database (not shown) communicatively coupled to the property information server 112. The database 110 may be any suitable database(s) or data storage mechanism(s) (e.g., one or more hard disk drives, optical storage drives, solid state storage devices, etc.).

As further shown in the example of FIG. 1, the mobile computing device 104 may include an image sensor, such as a camera 116, which may be used to capture one or more images of the property 102 (or portion(s) thereof) and thus determine corresponding image data, as further discussed below. As such, the mobile computing device 104 and the property 102 are shown as being communicatively coupled to and from one another in FIG. 1. It should be appreciated that the mobile computing device 104 may also or alternatively be configured to determine image data and/or other suitable identifying information associated with the property 102 (or portion(s) thereof) in a manner other than via use of the image sensor (e.g., camera 116), such as via suitable user input.

Although the example system 100 shows one property 102, one mobile computing device 104, one computer network 106, one insurance provider server 108, one database 110, one property information server 112, one contractor server 114, and one image sensor (e.g., one camera 116), the example system 100 may include more than one instance of one or more of these components. Additionally or alternatively, the example system 100 may not include one or more of the components illustrated in FIG. 1. For example, in one embodiment, the functionality provided by the property information server 112 may be provided by the insurance provider server 108 (or vice versa), and thus the property information server 112 (or the insurance provider server 108) may not be present. Thus, it will be further understood in light of the teaching and disclosure herein that various components shown in FIG. 1 need not be implemented as physically distinct components. As another example, the database 110 may be implemented as suitable data storage included in one or more of the insurance provider server 108 and/or the property information server 112.

Furthermore, while each of the mobile computing device 104, the insurance provider server 108, the property information server 112, and the contractor server 114 is shown as being communicatively coupled to the computer network 106, other arrangements may be implemented. As one example, the mobile computing device 104 may be directly connected to the insurance provider server 108, the property information server 112, and/or the contractor server 114 (not shown as such in FIG. 1), and/or the mobile computing device 104 may be indirectly connected to the insurance provider server 108, the property information server 112, and/or the contractor server 114 via, for example, components other than the computer network 106 (not shown in FIG. 1).

Still further, it will be appreciated from the teaching and disclosure herein that one or more components of the example system 100 may, in various embodiments, not perform or implement one or more actions described herein with respect to such component(s). As such, in various embodiments, one or more components of the example system 100 may be configured to perform various actions, but may perform less than all of such various actions.

Figure 2:
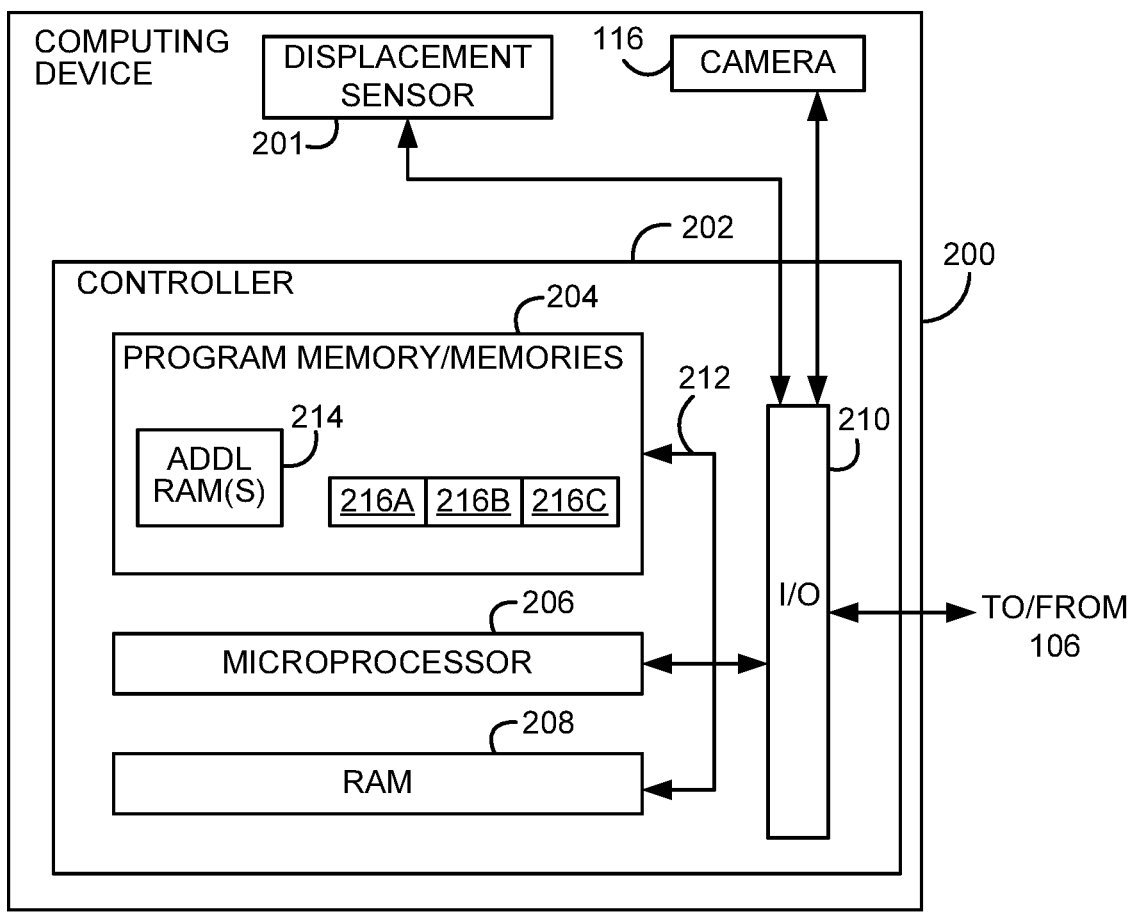
FIG. 2 illustrates an example computing device and components thereof.

Referring now to FIG. 2, an example computing device 200 and components thereof are illustrated. The example computing device 200 and components thereof may be used in implementing, for example, one or more of the mobile computing device 104, the insurance provider server 108, the property information server 112, and/or the contractor server 114. In the example shown in FIG. 2, the computing device 200 may include the camera 116, a position sensor (shown as a displacement sensor 201 in the example of FIG. 2), and a controller 202. The controller 202 may include a program memory 204, a microcontroller or a microprocessor 206, a random-access memory (RAM) 208, and an input/output (I/O) circuit 210, all of which may be interconnected via an address/data bus 212. The displacement sensor 201 and the camera 116 (e.g., when the example computing device 200 is implemented as the mobile computing device 104) may be connected to the I/O circuit 210 to provide dimension data and image data (e.g., dimension data and image data associated with a portion of the property 102, as further described herein) to the I/O circuit 210 for processing by, for example, the microprocessor 206. The program memory 204 may store computer-executable instructions, which may be executed by the microprocessor 206.

It should be appreciated that although FIG. 2 depicts only one microprocessor 206, the controller 202 may include multiple microprocessors 206. Similarly, the program memory 204 of the controller 202 may include additional RAM(s) 214 and multiple program memories storing, for example, modules, routines, and/or instructions for multiple corresponding applications 216A, 216B, and 216C (or any suitable number of applications), according to the particular configuration of the controller 202 and the computing device 200. Such modules, routines, and/or instructions, etc. may be used in performing various operations for providing user interaction data associated with a property, such as example operations as described herein.

Additionally, although FIG. 2 depicts the I/O circuit 210 as a single block, the I/O circuit 210 may include a number of different types of I/O circuits (not depicted). The RAM(s) 208, 214 and the program memory/memories storing, for example, instructions for the applications 216A, 216B and 216C, may be implemented in any known form of non-transitory computer readable storage media, including but not limited to semiconductor memories, magnetically readable memories, and/or optically readable memories. It should also be appreciated that the example computing device 200 may include additional, fewer, or alternate components.

In some embodiments, the instructions for, for example, the applications 216A, 216B, and/or 216C stored in the program memory/memories may include instructions for a mobile computing device application for providing user interaction data associated with a property, for example. For purposes of explanation, the present disclosure will at times refer to the application 216A as the application for providing user interaction data, it being understood that any suitable one or more of the applications 216A-216C may include instructions for the application for providing user interaction data.

As noted above, the mobile computing device 104 (which may be, for example, an implementation of the example computing device 200) may include an image sensor, such as, for example, the camera 116, to capture an image (e.g., photograph) of the property 102 for use in implementing the functionality of the example system 100, as further described below. For example, with further reference to the discussion above, the image sensor (e.g., the camera 116) may be in communication with the application 216A by way of the I/O circuit 210 (e.g., so that one or more sensed images may be used by the application 216A, as further described below). The displacement sensor 201 may also be in communication with the application 216A by way of the I/O circuit 210 so that one or more indications of dimensions may be used by the application 216A, as further described below.

With further reference to FIG. 1, the mobile computing device 104 may be any suitable computing device, such as but not limited to a smart phone, other mobile phone, a tablet, a phablet, smart glasses, other wearable computing device(s), etc. The computer network 106 may be or may include a computer network of the insurance provider (e.g., provided or used by the insurance provider or communications over which the insurance provider otherwise controls or facilitates). In various embodiments, processors of the devices communicatively coupled to the computer network 106 may execute instructions to transmit data to, receive data from, or otherwise communicate with other ones of the devices communicatively coupled to the computer network 106, as further described below. In various embodiments, such communication may include, but not be limited to, transmitting and/or receiving data within the context of the application 216A, for example. The computer network 106 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The computer network 106 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the example system 100 allows a user computing device (e.g., the mobile computing device 104) to communicate with components such as the insurance provider server 108 and/or the property information server 112 (and, in some cases, the database 110) to provide and/or receive information associated with the property 102, such as information discussed further herein. Additionally, as noted above and as will further become apparent from the description herein, the user interaction data in various embodiments may allow a user to more easily associate images of an interior(s) of a room(s) or other portion(s) of a property with the respective room(s) or other portion(s) of the property, for example. Advantageously, the user may thus be provided with a clear indication of which images of an interior(s) correspond to which room(s) or other portion(s) of the property. Furthermore, various embodiments allow such images to be used in contacting a contractor to perform improvements to a property, obtaining an insurance discount, and/or initiating a claim with or generally reporting a loss to an insurance provider. For example, such images may provide a quick visualization to a contractor of a portion(s) of a property that a homeowner wants or needs improved, and/or may be provided to the contractor to obtain information (e.g., a quote, details of service(s) needed, etc.) from the contractor regarding such an improvement(s).

III. EXAMPLE USER INTERACTION DATA AND USER INTERFACE VIEWS

Figure 3A:
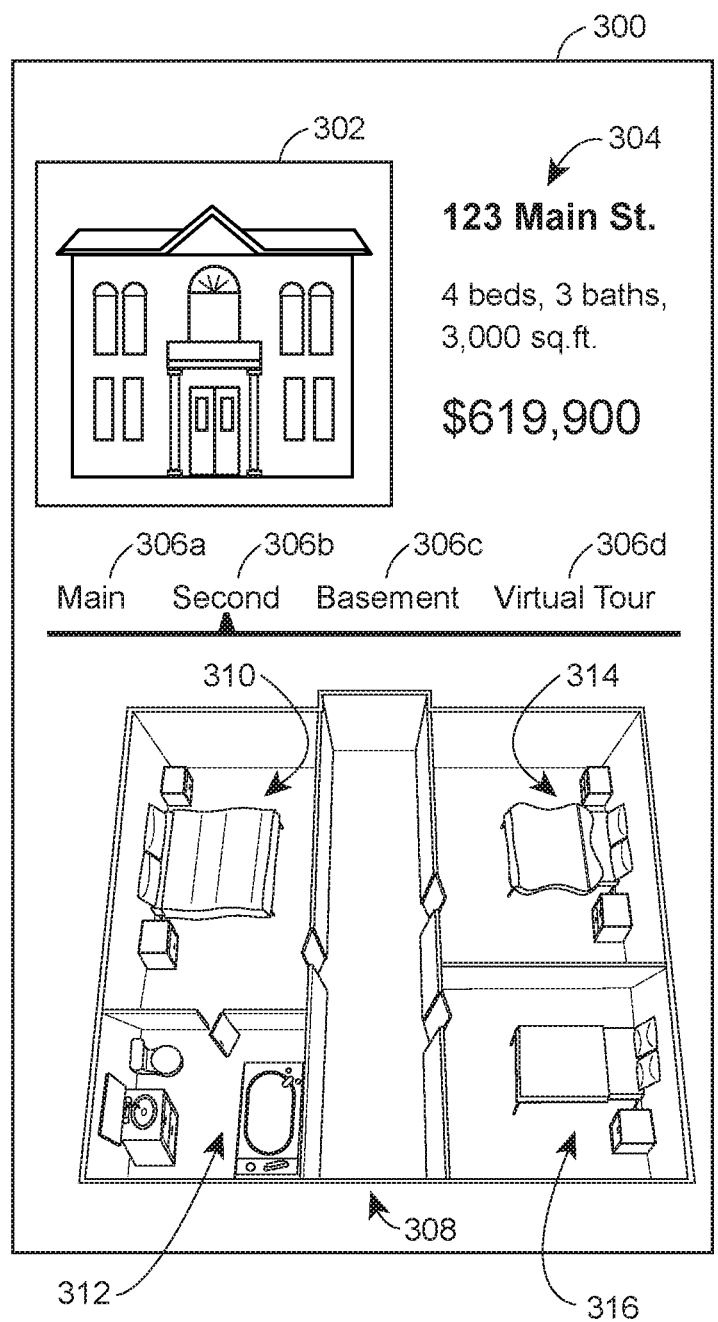
FIG. 3A illustrates an example user interface associated with providing user interaction data associated with a property.

FIG. 3A illustrates an example user interface 300 associated with providing user interaction data associated with a property. One or more electronic devices (e.g., the mobile computing device 104 and/or another suitable electronic device(s)) may be configured to display the example user interface 300 and/or may be configured to receive selections and/or inputs via the example user interface 300. In some embodiments, a mobile application (e.g., an application such as the application 216A, which may be developed to facilitate the providing of the user interaction data associated with the property 102) may be executed by the mobile computing device 104 (such as described above with respect to FIG. 2) and may cause display of the example user interface 300 on the mobile computing device 104.

As shown in FIG. 3A, the example user interface 300 may include a property image 302 which may be, for example, an image of an exterior of the property 102. In some embodiments, a user of the application 216A may operate the mobile computing device 104 so that the image sensor (e.g., the camera 116) captures one or more images of the exterior of the property 102 when the user is outside of the property 102 (e.g., at the property 102 for a showing). In other embodiments, the user of the application 216A may operate the mobile computing device 104 so that the camera 116 captures one or more images of the exterior of the property 102 by, for example, capturing an image of an image of the property 102 (e.g., photographing the property 102 while the property 102 is displayed on a website, displayed in a print medium, etc.).

Upon capturing an image of the exterior of the property 102, the property 102 may be identified (e.g., by address) based upon, for example, Global Positioning System (GPS) information associated with the mobile computing device 104 used to capture the image, information associated with an electronic or print listing or display of the property 102 which is used to capture the image of the property 102 as described above, machine learning techniques, and/or any other suitable information and/or technique(s). Based on the identification of the property 102, property information 304 may be further included in the example user interface 300. As shown in the example of FIG. 3A, the property information 304 may include, for example, an address of the property 102, a number of bedrooms and bathrooms of the property 102, a size of the property 102 (e.g., in square feet), an estimated value or sale price of the property 102, and/or any other suitable information regarding the property 102.

The example user interface 300 may also include view options, such as a first view option 306a to view images corresponding to user interaction data associated with all or a portion of a main level (e.g., ground floor) of the property 102; a second view option 306b to view images corresponding to user interaction data associated with all or a portion of a second level (e.g., second floor) of the property 102; a third view option 306c to view images corresponding to user interaction data associated with all or a portion of a basement level of the property 102; and a virtual tour option 306d. In some embodiments, the virtual tour option 306d, when selected by a user via the example user interface 300 (e.g., by touch input, keypad input, spoken input, etc.), may cause a display of the mobile computing device 104 to display images of rooms of the property 102 in sequence. For example, the display of images may begin with display of images of interiors of rooms/other portions of the basement level of the property 102, and then proceed with display of images of interiors of rooms/other portions of the first level of the property 102, and then proceed with display of images of interiors of rooms/other portions of the second level of the property 102. With reference to the discussion above, the virtual tour option 306d, when selected by a user via the example user interface 300, may display such images of rooms/portions of the property 102 in conjunction with (e.g., concurrently with) displaying the pluralities of dimensions associated with the respective rooms/portions of the property 102, and/or in conjunction with displaying indications of the respective rooms/portions of the property 102. It should be appreciated that in various embodiments, the user interaction data may include, for example, image data corresponding to images for a single room or other portion of a property; image data corresponding to images for multiple rooms and/or other portions of a property (including, in some examples, image data corresponding to images of an entire interior of a property, such as in examples where images are provided in response to selection of the virtual tour option 306d); and/or any other suitable data that, for example, allows a user of a user interface (e.g., the example user interface 300) to view at least one image of a portion of the property 102, as further discussed herein.

More particularly, the example user interface 300 may include a layout view 308 showing rooms/portions of a level of the property 102. In the illustrated example, the layout view 308 shows a simplified view of a second level of the property 102 (e.g., as selected by way of the second view option 306b). The layout view 308 of the second level shows images of an interior 310 of a master bedroom and a plurality of dimensions associated with the master bedroom (e.g., by way of showing the arrangement of walls enclosing the master bedroom), images of an interior 312 of a master bath and a plurality of dimensions associated with the master bath, images of an interior 314 of a first smaller bedroom and a plurality of dimensions associated with the first smaller bedroom, and images of an interior 316 of a second smaller bedroom and a plurality of dimensions associated with the second smaller bedroom. While the example user interface 300 of FIG. 3A shows the layout view 308 as an overhead view of the images of the interiors 310-316 of the master bedroom, master bath, first smaller bedroom, and second smaller bedroom, it should be appreciated in light of the teaching and disclosure herein that any suitable view(s) of the images of the interiors 310-316 may be shown as the layout view 308 or as part of the layout view 308, such as an elevation view(s); consecutive views of the images of the interiors 310, the images of the interiors 312, the images of the interiors 314, and the images of the interiors 316; etc.

By providing images of an interior(s) of a room(s) and/or other portion(s) of the property 102 in conjunction with the pluralities of dimensions associated with the respective room(s)/portion(s) (including, for example, by way of an overhead view such as the layout view 308), and/or in conjunction with an indication(s) of the respective room(s)/portion(s) of the property 102, various advantages are achieved. For example, the example user interface 300 facilitates a seller of the property 102 making available such images that may be easily associated with their respective room(s)/portion(s) of the property 102. A prospective purchaser of the property 102 may thus more easily browse the layout of the property 102, more easily visualize where the purchaser may place belongings in various room(s)/portion(s) of the property 102, more easily associate images of an interior(s) of rooms(s)/portion(s) of the property 102 as compared to existing collections of images of a property interior that do not indicate or specify to which room(s) the images correspond, etc.

With further reference to the discussion above, the embodiments described herein also allow a homeowner to, for example, show an image(s) of a portion(s) of the property 102 to a contractor, update an image(s) of a portion(s) of the property 102 to show an interior(s) of the portion(s) of the property 102 after a loss has been sustained and submit such image(s) to an insurance provider, etc. These and other advantages are also described in greater detail below.

Figure 3B:
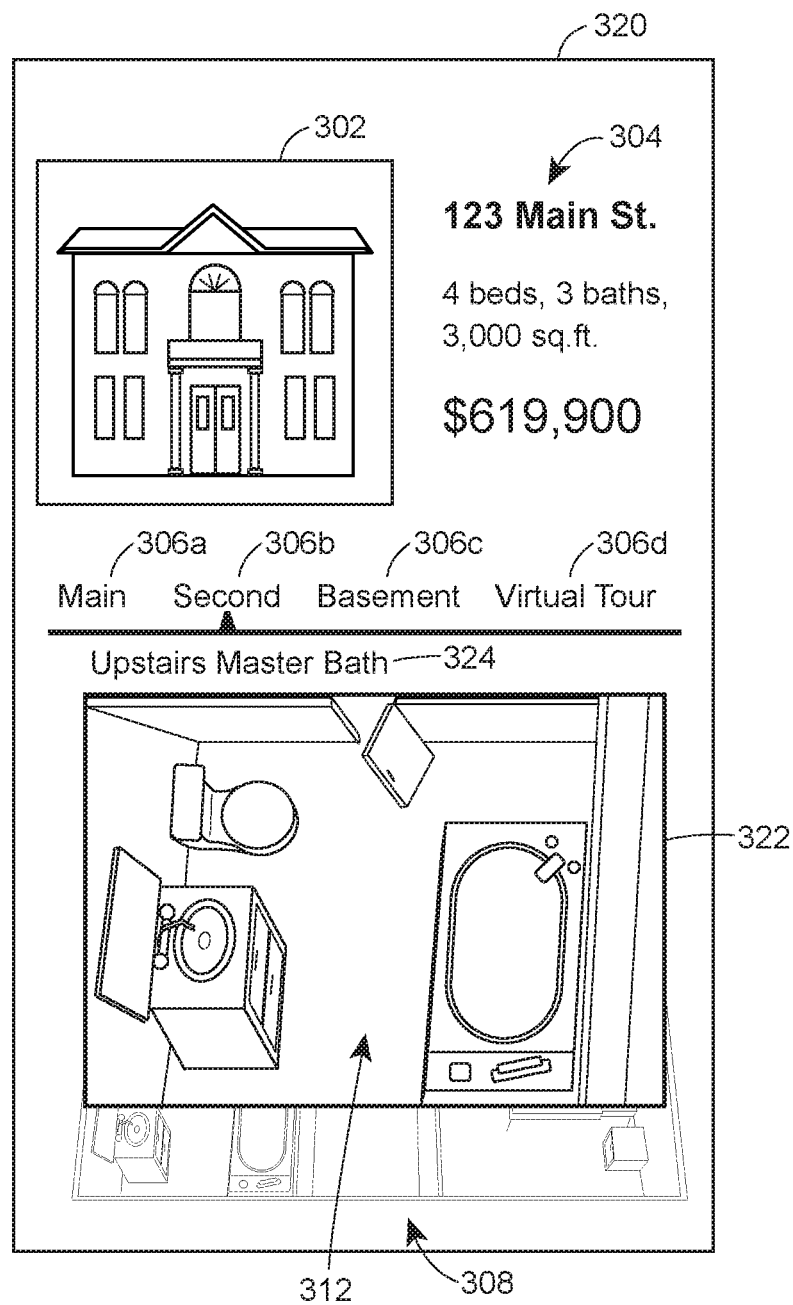
FIG. 3B illustrates another example user interface associated with providing user interaction data associated with a property.

FIG. 3B illustrates another example user interface 320 associated with providing user interaction data associated with a property. One or more electronic devices (e.g., the mobile computing device 104 and/or another suitable electronic device(s)) may be configured to display the example user interface 320 and/or may be configured to receive selections and/or inputs via the example user interface 320. As with the example user interface 300, in some embodiments, the application 216A may be executed by the mobile computing device 104 and may cause display of the example user interface 320 on the mobile computing device 104.

As shown in FIG. 3B, the example user interface 320 may include the property image 302 and the property information 304 as included in the example user interface 300. The example user interface 302 may also include the view options 306a-306d and the layout view 308. In the example user interface 302, an enlarged interior view 322 is shown. The enlarged interior view 322, in the example of FIG. 3B, includes an enlarged view of contents, fixtures, etc. of an upstairs master bath, as indicated by the enlarged interior view caption 324. The enlarged interior view 322 may be selected to show the enlarged view of the interior of the upstairs master bath by, for example, selecting the second view option 306b, and then selecting (e.g., touching, clicking on, hovering over with a pointer icon, etc.) the master bath from the layout view 308 to overlay the enlarged interior view 322 on a portion of the layout view 308 as shown. In this manner, a user may view images of an interior of a desired room or other portion of the property 102 in greater detail, for example.

Additionally, with reference to the discussion above, in some embodiments, the enlarged interior view 322 may be used to provide images corresponding to user interaction data associated with a room(s) or other portion(s) of the property 102 to a contractor contacted by, for example, a homeowner in order to discuss an improvement (e.g., repair, renovation, etc.) to the room(s) or other portion(s) of the property 102 shown in the enlarged interior view 322. For example, the enlarged interior view 322 may be shown directly to a contractor in person, or image data corresponding to the enlarged interior view 322 may be sent to the contractor, such as via the computer network 106 to a server of or used by the contractor (e.g., the contractor server 114). The enlarged interior view 322 may also be shown directly to a representative of an insurance provider that insures the property 102, or corresponding image data may be provided to the insurance provider server 108 via the computer network 106, for example, in order to provide an indication to the insurance provider of the extent of a loss sustained at the property 102.

Figure 3C:
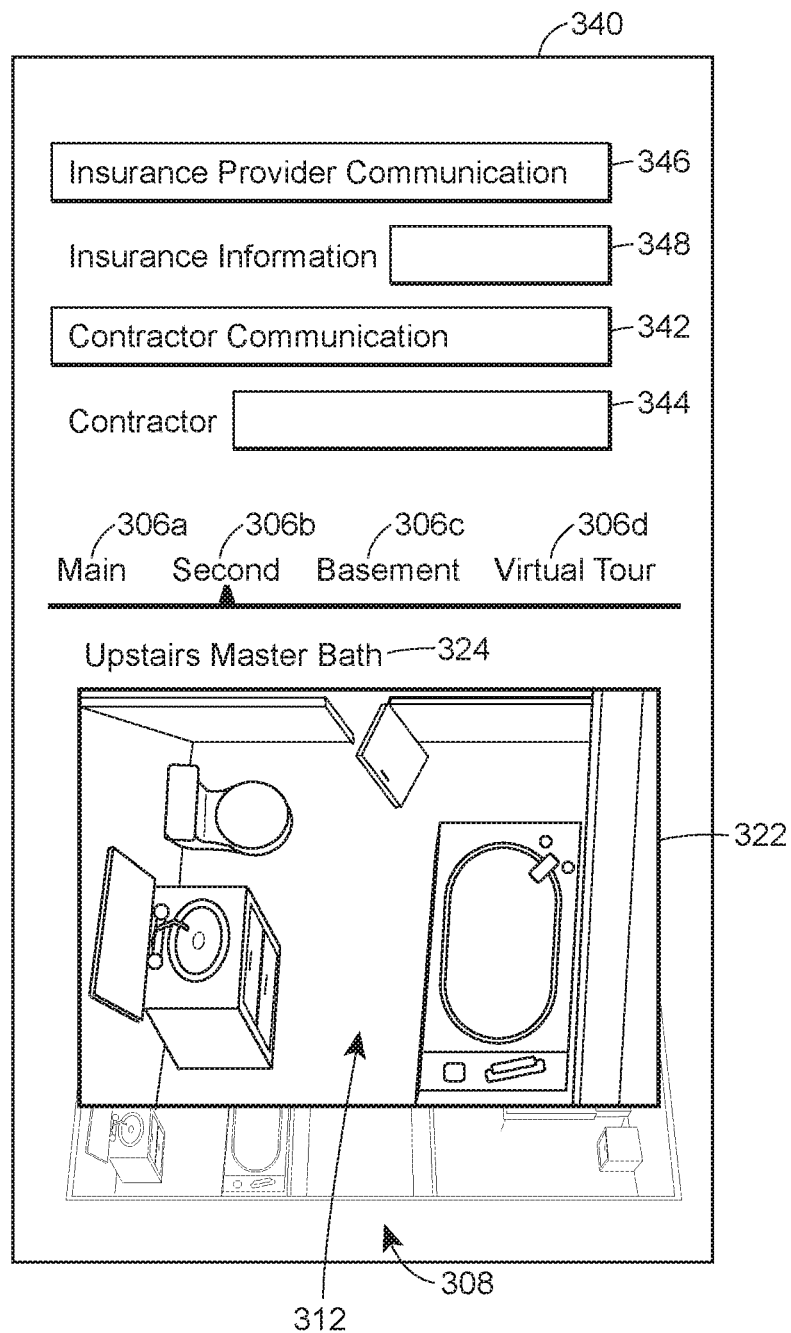
FIG. 3C illustrates yet another example user interface associated with providing user interaction data associated with a property.

FIG. 3C illustrates yet another example user interface 340 associated with providing user interaction data associated with a property. In various embodiments, the example user interface 340 may be displayed by way of the same or similar techniques as described above with respect to FIGS. 3A and 3B, and selections and/or inputs may also be received via the example user interface 340 in the same or similar manners as described with respect to FIGS. 3A and 3B. As shown in FIG. 3C, the example user interface 340 may include the view options 306a-306d, the layout view 308, the enlarged interior view 322, and the enlarged interior view caption 324. In some embodiments, the example user interface 340 may also include the property image 302 and/or the property information 304 (not shown in FIG. 3C). Generally speaking, it should be appreciated that each of the user interfaces 300, 320, and 340 is, as described herein, by way of example, and that any suitable information and/or capabilities for user interaction may be included in each of the user interfaces 300, 320, and 340.

As shown in FIG. 3C, the example user interface 340 may additionally include a contractor communication option 342, such as a selectable (e.g., by way of touch input, mouse click, etc.) icon that, when selected by a user, may cause the mobile computing device 104 to communicate with a computing device of the contractor (e.g., the contractor server 114). For example, selection of the contractor communication option 342 may cause image data corresponding to the enlarged interior view 322 to be sent to a contractor. The contractor to which such image data is to be sent may be identified in the contractor identification field 344, and in some embodiments the contractor identification field 344 may be populated by suitable user selection of the contractor from, for example, a menu that may in turn be populated with information obtained from the insurance provider server 108, the property information server 112, and/or another suitable source(s).

The example user interface 340 may further include an insurance provider communication option 346, such as a selectable icon that, when selected by a user, causes image data corresponding to the enlarged interior view 322 and/or other image data (e.g., image data corresponding to the layout view 308 as a whole) to be sent to an insurance provider that provides insurance coverage with respect to the property 102. As discussed herein, a homeowner, condominium owner, etc. may opt to send such image data to the insurance provider after the property 102 has sustained a loss. Such image data may indicate the current condition of the contents, fixtures, etc. of the corresponding room(s) and/or other portion(s) of the property 102. In some embodiments, whether the image data sent to the insurance provider corresponds to the enlarged interior view 322, the layout view 308, or another view(s) (e.g., views of the entirety of the interior of the property 102) may be user-selectable and may be pre-selected by the user before such image data is sent to the insurance provider in response to selection of the insurance provider communication option 346.

The example user interface 340 may still further include an insurance information field 348, which may in some embodiments display information regarding insurance coverage that a homeowner, condominium owner, etc. (who may be the user of the example user interface 340) has for the property 102. For example, the insurance information field 348 may display information regarding an insurance discount that may be provided for the insurance coverage (e.g., a premium discount). The information regarding the insurance discount may in some embodiments be determined at the insurance provider server 108, and sent to the mobile computing device 104 for display in the example user interface 340, in response to the user (e.g., homeowner) contacting a contractor, such as by selection of the contractor communication option 342. In other examples, the insurance information field 348 may display information regarding processing of a claim for loss sustained at the property 102, such as after a user selects the insurance provider communication option 346 to send image data to the insurance provider. Such information regarding processing of a claim may indicate, in various embodiments, a status of claim processing, claim settlement information, insurance agent contact information, and/or premium adjustments resulting from submission of the claim, etc.

IV. EXAMPLE METHODS FOR PROVIDING AND USING USER INTERACTION DATA ASSOCIATED WITH A PROPERTY

Figure 4:
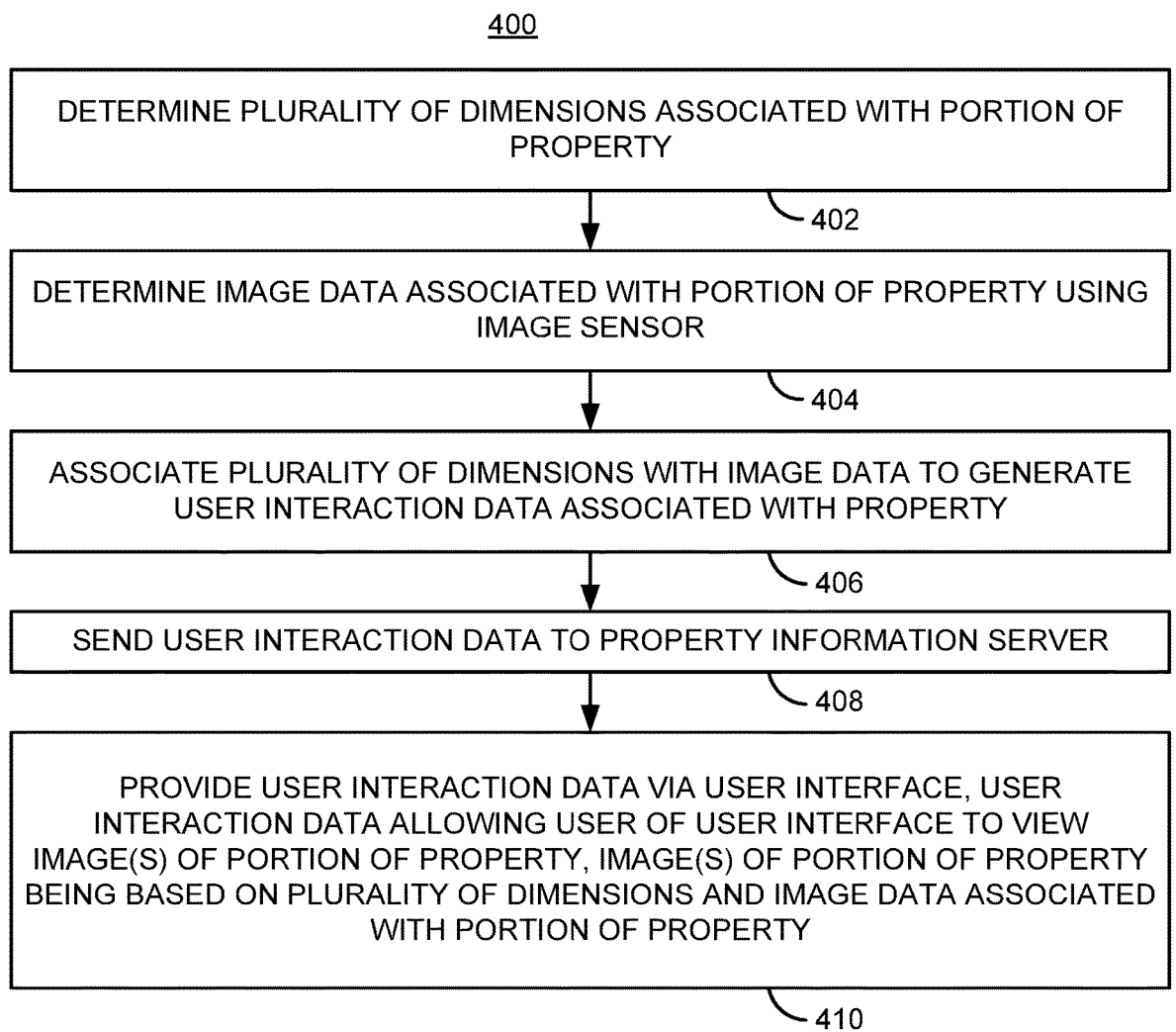
FIG. 4 is a flow chart of an example method, routine, or process for providing user interaction data associated with a property.

FIG. 4 is a flow chart of an example method, routine, or process 400 for providing user interaction data associated with a property, such as the property 102. One or more processors, which may be one or more processors of the mobile computing device 104, such as a microprocessor(s) implemented as described above with respect to FIG. 2, may determine a plurality of dimensions associated with a portion of a property (e.g., the property 102) (block 402). As noted above, the portion of the property 102 may in some embodiments be the entire interior of the property 102, and may in other embodiments be less than the entire interior of the property 102 (e.g., one or more rooms and/or other portion(s) of the property 102).

With further reference to the discussion above, the plurality of dimensions may be determined by determining wall placement for the portion of the property 102, for example. As discussed in greater detail below, a position sensor of the mobile computing device 104 may be used in determining such wall placement. In various embodiments, the position sensor may be the displacement sensor 201 or an image sensor. In various embodiments, a user of the mobile computing device 104 (e.g., a homeowner or condominium owner of the property 102) may operate the mobile computing device 104 or another suitable device so that the one or more processors determine the plurality of dimensions (e.g., may operate the mobile computing device 104 so that the one or more processors determine wall placement for the portion of the property 102).

In some embodiments, the plurality of dimensions associated with the portion of the property 102 may be determined by selection of example (e.g., "standard" or "stock") dimensions (e.g., floor plans or portion(s) thereof) that correspond to the dimensions of the portion of the property 102. For example, the insurance provider server 108 and/or the property information server 112 may store indications of such example dimensions, and such indications of example dimensions may be selected by a user of the mobile computing device 104 via, for example, a suitable input to the mobile computing device 104.

The example method, routine, or process 400 may further include determining image data associated with the portion of the property 102 (block 404). In various embodiments, the image data may be determined using an image sensor (e.g., using an output of an image sensor, such as from an output of the camera 116 of the mobile computing device 104). For example, the image data may be determined by the one or more processors receiving, from the camera 116, image data that corresponds to an image captured by the camera 116 and, in some cases, performing suitable processing of the image data received by the camera 116. In various embodiments, a user of the mobile computing device 104 (e.g., a homeowner or condominium owner of the property 102) may operate the camera 116 or other image sensor so that the one or more processors determine the image data associated with the portion of the property 102. For example, the user may operate the camera 116 so that the camera 116 captures an image(s) of the portion of the property 102 to cause the one or more processors to determine the aforementioned image data.

The one or more processors may associate the plurality of dimensions associated with the portion of the property 102 with the image data associated with the portion of the property 102 to generate user interaction data associated with the property 102 (block 406). The user interaction data associated with the property 102 may, more particularly, be associated with the entire interior of the property 102, or may be associated with a portion of the property 102 that is less than the entire interior of the property 102.

The one or more processors may send the user interaction data (e.g., data indicative of the determined plurality of dimensions and the determined image data, as further discussed below) to the property information server 112 (block 408). In this manner, for example, as a user operates the mobile computing device 104 to, for example, cause the one or more processors to determine pluralities of dimensions and respective image data, data indicative of the determined pluralities of dimensions and the respective image data may be stored for later use in, for example, providing the view options 306*a*-306*d* and the layout view 308 via a user interface.

The one or more processors may provide, via a user interface, the user interaction data (block 410). For example, the one or more processors may provide the user interaction data via the example user interface(s) 300, 320, and/or 340 in the manner described above. The user interaction data may allow a user (e.g., a user of the mobile computing device 104) to view at least one image of the portion of the property 102. The at least one image may be based on the aforementioned plurality of dimensions associated with the portion of the property 102 and the aforementioned image data associated with the portion of the property 102. More particularly, with reference to the discussion above, the at least one image of the portion of the property 102 may be or may include at least one image depicting both (i) the plurality of dimensions associated with the portion of the property 102 (e.g., depicting wall placements) and (ii) an interior of the portion of the property 102, for example.

With further reference to the discussion above, the user interaction data may be or may include, for example, (i) data indicative of the aforementioned plurality of dimensions (e.g., data indicative of wall placements) and (ii) the aforementioned image data. In such examples, the user interaction data may allow a user of, for example, the user interface(s) 300, 320, and/or 340 to view at least one image of the portion of the property 102 by way of the user interaction data being provided (e.g., displayed) to the user via the user interface(s) 300, 320, and/or 340.

In other examples, the user interaction data may be or may include, for example, (i) data indicative of multiple pluralities of dimensions, or a plurality of dimensions for multiple portions of the property 102, and (ii) image data associated with multiple portions of the property 102. In such examples, the user interaction data may more particularly include, in some cases, image data corresponding to images of an entire interior of the property 102, such as where images of the entire interior of the property 102 are made available to the user. For example, images of the entire interior of the property 102 may be made available to the user by user selection of different levels of the property 102 to be viewed (e.g., by way of user selection of each of the first, second, and third view options 306a-306c), and/or by user selection of the virtual tour option 306d as described above.

As such, in various embodiments, selection of one of the view options 306a-306d may cause the mobile computing device 104 to retrieve, from the property information server 112, user interaction data indicative of one or more pluralities of dimensions and respective image data for display of at least one corresponding image via the example user interface(s) 300, 320, and/or 340. For example, user interaction data indicative of pluralities of dimensions and respective image data for a main level of the property 102 may be retrieved from the property information server 112, and corresponding images may be provided (e.g., displayed) via the user interface, when the first view option 306a is selected.

As will be apparent from the above description, and as should be appreciated with respect to all examples presented in this disclosure, various ones of the functions or operations shown in FIG. 4 are optional. Furthermore, the functions or operations shown in FIG. 4 (and each flow chart herein) may be performed in any suitable order, any desired number of times, and/or with any suitable variation to the particular order and/or combination shown so as to achieve a desired result, such as a desired manner of providing user interaction data associated with a property (e.g., the property 102).

Figure 5:
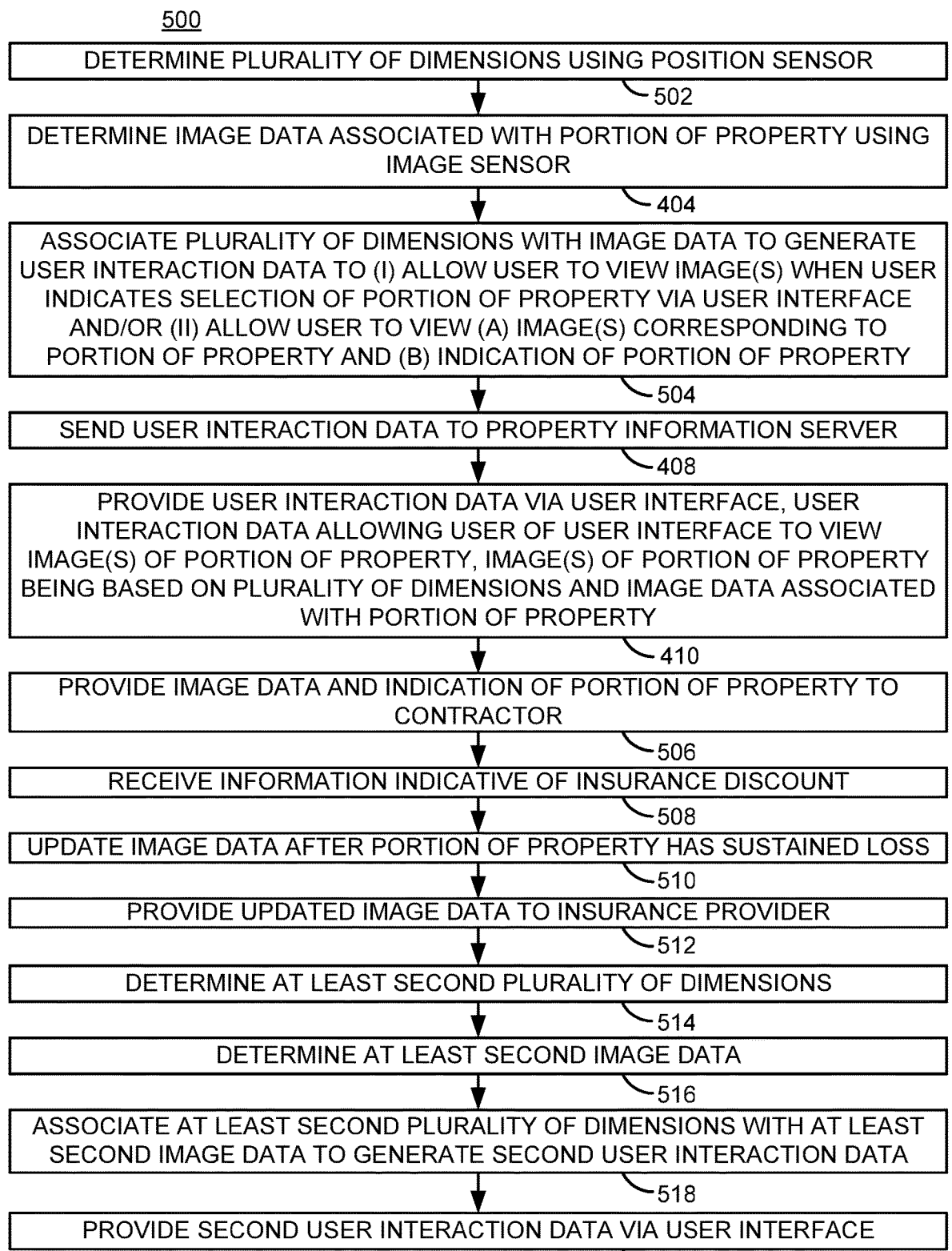
FIG. 5 is a flow chart of an example method, routine, or process for providing and using user interaction data associated with a property.

FIG. 5 is a flow chart of an example method, routine, or process 500 for providing and using user interaction data associated with a property, such as the property 102. As will be appreciated in light of the following discussion, the example method, routine, or process 500 may correspond to a more detailed implementation(s) of aspects of the example method, routine, or process 400, and may include additional actions, such as additional actions relating to providing and/or using the user interaction data.

One or more processors, which may be one or more processors of the mobile computing device 104, may determine a plurality of dimensions associated with a portion of a property (e.g., the property 102) (block 502). The actions described with respect to block 502 may include one or more of the actions described with respect to block 402 of the example method, routine, or process 400, and more particularly, determining the plurality of dimensions associated with the portion of the property 102 may be performed further using a position sensor (e.g., the displacement sensor 201).

For example, the displacement sensor 201 may be a sensor that a user (e.g., homeowner, condominium owner, etc.) may use to measure wall placement for the portion of the property 102. In one example, the user may walk along the lengths of walls of the portion of the property 102 while operating the mobile computing device 104 so as to use the displacement sensor 201 to measure wall placement.

As noted above, in other embodiments, the position sensor of the mobile computing device 104 may be an image sensor. In some examples, the image sensor may be the same image sensor (e.g., the camera 116) used to determine the image data associated with the portion of the property 102, as described with respect to block 404. In other examples, the image sensor may be a different (e.g., second) image sensor, such as a second camera (not shown) in addition to the camera 116, for example.

The example method, routine, or process 500 may also include performing the actions described with respect to block 404 of FIG. 4 to determine the image data associated with the portion of the property 102. The example method, routine, or process 500 may also include the one or more processors associating the plurality of dimensions associated with the portion of the property 102 with the image data associated with the portion of the property 102 to generate the user interaction data to at least one of (i) allow the user to view at least one image corresponding to the portion of the property 102 when the user indicates a selection of the portion of the property 102 via the user interface (e.g., using one of the view options 306a-306d), or (ii) allow the user to view (a) at least one image corresponding to the portion of the property 102 and (b) an indication of the portion of the property 102 (block 504). It will be appreciated in light of the teaching and disclosure herein that the actions described with respect to block 504 may correspond to a more detailed example implementation of the actions described with respect to block 406 of FIG. 4.

With continued reference to the actions described with respect to block 504, the user interaction data may be generated to allow the user to view at least one image corresponding to the portion of the property 102 and an indication of the portion of the property 102 by generating data that allows (i) the providing of a collection of images of at least a portion of the property 102 (with such providing in some cases being in response to selection of one of the view options 306a-306d) and (ii) the providing of captions, text indications, and/or other suitable indications associated with the image(s) for each portion of the property 102. As a more specific example, user interaction data corresponding to a main level of the property 102 may allow providing of images of rooms and other portions of the main level of the property 102, and may allow providing of captions (e.g., by way of the enlarged interior view caption 324 or other suitable indication(s)) indicating the rooms and other portions of the main level of the property 102 as the user, for example, clicks or swipes through images of such rooms and portions. Thus, it will be appreciated that the user interaction data may, in some embodiments, further include the data in the enlarged interior view caption 324 or other suitable caption(s) or indication(s) used to indicate a portion of the property 102.

The one or more processors may perform the actions described with respect to blocks 408 and 410 of FIG. 4 to, for example, send the user interaction data to the property information server 112 (block 408) and provide the user interaction data via a user interface when the user interaction data is retrieved from the property information server 112 (block 410).

The one or more processors may provide the image data associated with the portion of the property 102 and an indication of the portion of the property 102 to a contractor contacted by a party associated with the property 102 regarding an improvement (e.g., repair, renovation, other upgrade, etc.) to the portion of the property 102 (block 506). The party associated with the property 102 may be, for example, a homeowner or condominium owner of the property 102. In another example, the party associated with the property 102 may be a prospective purchaser of the property 102 who has access to the user interaction data as made available (e.g., in an online listing, etc.) by the homeowner or condominium owner of the property 102, for example.

In one example, the one or more processors may send the image data in the enlarged interior view 322 and the information in the enlarged interior view caption 324 to the contractor server 114 via the computer network 106. With reference to the discussion of FIG. 3C, in some embodiments, the one or more processors may send the image data and the indication of the portion of the property 102 in response to selection of the contractor communication option 342 when a contractor is identified in the contractor identification field 344. In another example, the one or more processors may send, to the contractor server 114, at least some of the image data in the layout view 308 corresponding to one or more of the view options 306a-306d. In this example, an indication(s) of the selected view option(s) may also be sent to the contractor server 114 and may constitute the indication of the portion(s) of the property 102 for which associated image data is sent to the contractor server 114.

With continued reference to the actions described with respect to block 506, in some embodiments, when the one or more processors provide the image data and the indication of the portion of the property 102 to the contractor, a suitable indication(s) that such image data and such an indication have been provided may be sent to the insurance provider server 108 and/or the property information server 112. When such indication(s) is/are sent to the property information server 112, the insurance provider server 108 may in some cases retrieve such indication(s) from the property information server 112 when, for example, the insurance provider performs actions such as those described below.

The one or more processors may receive information indicative of an insurance discount for insurance coverage provided by the insurance provider for the property 102 (block 508). The information indicative of the insurance discount may be based on the party associated with the property 102 contacting the contractor regarding the improvement to the portion of the property 102 in the manner described with respect to block 506. More particularly, an indication (e.g., identification) of the contractor may be provided from the contractor server 114 to the insurance provider server 108, for example. The insurance provider server 108 may determine, or may receive (e.g., from a representative of the insurance provider) a determination of, whether an insurance discount is to be provided for the insurance coverage, and may send the information indicative of any insurance discount to be provided via the computer network 106 to the one or more processors.

For example, the insurance provider server 108 may determine that an insurance discount is to be provided for the insurance coverage when the party associated with the property 102 contacts and selects (e.g., hires) a contractor for an improvement(s), and the selected contractor is a member of a preferred or approved list of contractors. Such a preferred or approved list of contractors may be maintained by the insurance provider, for example. In some embodiments, the determination of whether an insurance discount is to be provided for the insurance coverage may additionally or alternatively depend on the type of improvement(s) to be made and/or any other suitable factors, and information regarding such factors may be input by a user of the mobile computing device 104 and sent to the insurance provider server 108 via the computer network 106.

In some embodiments, after an improvement(s) is/are made to the property 102 by the contractor, the party associated with the property 102 (e.g., homeowner) may use the image sensor (e.g., camera 116) to once again determine image data associated with a portion of the property 102 (e.g., in the same or a similar manner as described with respect to block 404). It will be appreciated from the teaching and disclosure herein that such image data may thus be indicative of an updated interior of the portion of the property 102. In some embodiments, the mobile computing device 104 may send such updated image data to the property information server 112, such as in response to a user selection via a suitable prompt or icon on a user interface.

Additionally or alternatively, the example method, routine, or process 500 may similarly include updating the image data associated with a portion of the property 102 after the portion of the property 102 has sustained a loss covered by the insurance provider (block 510). For example, a user may use the image sensor to determine such updated image data indicative of a condition of the portion of the property 102 when the portion of the property 102 has sustained the loss.

The one or more processors may provide such updated image data associated with the portion of the property 102 to the insurance provider when the loss covered by the insurance provider is reported to the insurance provider (block 512). The loss may be reported to the insurance provider by, for example, a user of the mobile computing device 104 calling a representative of the insurance provider, operating the mobile computing device 104 so as to send a suitable indication of the loss to the insurance provider server 108 via the computer network 106, etc. The updated image data may be provided to the insurance provider by, for example, the mobile computing device 104 sending the updated image data to the insurance provider server 108. Additionally or alternatively, the updated image data may be sent to the property information server 112 and, for example, may be made accessible to the insurance provider server 108. With reference to the discussion above, the updated image data may be used in determining updated insurance data, such as a premium adjustment in response to the loss, and/or may be used in processing a claim for the loss, etc.

The one or more processors may determine at least a second plurality of dimensions associated with at least a second portion of the property 102 (block 514). For example, the one or more processors may determine the at least the second plurality of dimensions in the same or a similar manner that the (first) plurality of dimensions associated with the (first) portion of the property 102 may be determined as described with respect to block 402.

The example method, routine, or process 500 may further include determining (e.g., using the image sensor as discussed elsewhere herein) at least second image data associated with the at least the second portion of the property 102 (block 516). The determination of the at least the second image data may be performed in the same or a similar manner as the determination of the (first) image data as described with respect to block 404.

The one or more processors may associate the at least the second plurality of dimensions with the at least the second image data to generate second user interaction data associated with the at least the second portion of the property 102 (block 518). The actions described with respect to block 518 may be performed in the same or a similar manner as the actions described with respect to block 406. The one or more processors may also provide, via the user interface, the second user interaction data (block 520), in the same or a similar manner as the one or more processors may provide the (first) user interaction data as described with respect to block 410.

The second user interaction data may allow a user of the user interface to view at least one image of the second portion of the property 102, while as noted above the (first) user interaction data may allow the user to view at least one image of the (first) portion of the property 102. In this manner, the user may, for example, use the mobile computing device 104 as described herein to determine multiple pluralities of dimensions and image data associated with multiple portions of the property 102 (and in some cases, the entire interior of the property 102), and user interaction data allowing viewing of images of the multiple portions of the property 102 may be provided as more fully described above.

As also described above, a homeowner may thus advantageously make available such images that may be easily associated with their respective portions of the property 102. Additionally, a prospective purchaser of the property 102 may more easily browse the layout of the property 102, more easily visualize where the purchaser may place belongings in various portions of the property 102, more easily associate images of interiors of portions of the property 102 as compared to existing collections of images of a property interior that do not indicate or specify to which portions the images correspond, etc. The user (e.g., prospective purchaser) may thus be provided with a virtual walkthrough of the property 102 or a portion(s) thereof, and may visualize images of the interior of the property 102. Among other advantages, such images may be more indicative of actual sizes of the interior(s) of the portion(s) of the property 102 as compared to wide-angled pictures of the interior of a property that are presented in existing electronic and print real estate listings.

V. ADDITIONAL CONSIDERATIONS

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the mobile computing device 104, the insurance provider server 108, the property information server 112, the contractor server 114, and/or any other computing devices within the example system 100 in any suitable combination). The routines may be included as part of any of the modules described in relation to FIG. 1 or as part of a module that is external to the system illustrated by FIG. 1. For example, the methods or portions thereof may be part of a browser application(s) or an application(s) running on any of the devices in the example system 100 as a plug-in or other module of the browser application. Further, the methods may be employed as "software-as-a-service" to provide, for example, the mobile computing device 104, the insurance provider server 108, the property information server 112, the contractor server 114, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for providing user interaction data associated with a property. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A sensor based property inspection method for providing user interaction data associated with properties based on inputs received from corresponding users, the method comprising:

determining, using a position sensor, a plurality of dimensions associated with an interior portion of a property;

capturing, using an image sensor, a plurality of images of the property, including at least (i) a first image of the interior portion of the property and (ii) a second image of an exterior portion of the property;

determining, using the image sensor, image data associated with at least the interior portion of the property, wherein the image data is determined based on the first image;

determining, using the one or more processors, a set of property information based on the second image, wherein the set of property information includes at least an identification of the property;

coupling, using one or more processors, (i) each of the plurality of dimensions associated with the interior portion of the property with (ii) a respective portion of the image data associated with the interior portion of the property to generate the user interaction data associated with the property;

providing, by a user interface, a contractor communication option, the one or more processors, upon selection of the contractor communication option, configured to transmit (1) the image data associated with the interior portion of the property, (2) an indication of the interior portion of the property, and (3) the set of property information to a user device of a contractor, wherein the contractor corresponds to an improvement to the interior portion of the property; and providing, using the one or more processors via the user interface, the user interaction data and the set of property information, the user interaction data allowing a user of the user interface to view at least one image of the interior portion of the property, the at least one image being based on the plurality of dimensions associated with the interior portion of the property and the image data associated with the interior portion of the property.

2. The computer-implemented method of claim 1, wherein the image sensor is a first image sensor, and wherein the position sensor is one of the first image sensor or a second image sensor.

3. The computer-implemented method of claim 1, wherein the interior portion of the property includes at least one room of the property, and wherein the image data includes image data indicative of contents of the at least one room of the property.

4. The computer-implemented method of claim 1, wherein coupling each of the plurality of dimensions associated with the interior portion of the property with the respective portion of the image data associated with the interior portion of the property to generate the user interaction data includes generating, using the one or more processors, the user interaction data to at least one of (i) allow the user to view at least one image corresponding to the interior portion of the property when the user indicates a selection of the interior portion of the property via the user interface, or (ii) allow the user to view (a) at least one image corresponding to the interior portion of the property and (b) an indication of the interior portion of the property.

5. The computer-implemented method of claim 1, further comprising providing, using the one or more processors, the image data associated with the interior portion of the property and an indication of the interior portion of the property to a contractor contacted by a party associated with the property regarding an improvement to the interior portion of the property.

6. The computer-implemented method of claim 5, further comprising receiving, using the one or more processors, information indicative of an insurance discount for insurance coverage provided for the property by an insurance provider, the information indicative of the insurance discount being based on the party associated with the property contacting the contractor regarding the improvement to the interior portion of the property.

7. The computer-implemented method of claim 1, wherein the image data associated with the interior portion of the property is indicative of a condition of the interior portion of the property when the interior portion of the property has sustained a loss covered by an insurance provider, the method further comprising providing, using the one or more processors, the image data associated with the interior portion of the property to the insurance provider when the loss covered by the insurance provider is reported to the insurance provider.

8. The computer-implemented method of claim 1, wherein the interior portion of the property is a first portion of the property and includes a first level of the property, wherein the plurality of dimensions associated with the first portion of the property and the image data associated with the first portion of the property are a first plurality of dimensions and first image data, and wherein the user interaction data is first user interaction data, the method further comprising:
  determining, using the one or more processors, at least a second plurality of dimensions associated with at least a second portion of the property;
  determining, using the image sensor, at least second image data associated with the at least the second portion of the property;
  coupling, using the one or more processors, (i) each of the at least the second plurality of dimensions with (ii) a respective portion of the at least the second image data to generate second user interaction data associated with the at least the second portion of the property; and
  providing, using the one or more processors via the user interface, the second user interaction data, the second user interaction data allowing the user to view at least one image of the at least the second portion of the property.

9. A sensor based property inspection computing device for providing user interaction data associated with properties based on inputs received from corresponding users, the computing device comprising:
  an image sensor configured to:
    capture a plurality of images of a property, including at least (i) a first image of an interior portion of the property and (ii) a second image of an exterior portion of the property; and
    determine image data associated with at least the interior portion of the property, wherein the image data is determined based on the first image;
  a position sensor configured to determine a plurality of dimensions associated with the interior portion of the property;
  one or more processors; and
  one or more memories coupled to the one or more processors,
  the one or more memories including non-transitory computer executable instructions stored therein that, when executed by the one or more processors, cause the one or more processors to:
    determine a set of property information based on the second image, wherein the set of property information includes at least an identification of the property;
    couple (i) each of the plurality of dimensions associated with the interior portion of the property with (ii) a respective portion of the image data associated with the interior portion of the property to generate the user interaction data associated with the property;
    provide, by a user interface, a contractor communication option, the one or more processors, upon selection of the contractor communication option, configured to transmit (1) the image data associated with the interior portion of the property, (2) an indication of the interior portion of the property, and (3) the set of property information to a user device of a contractor, wherein the contractor corresponds to an improvement to the interior portion of the property; and
    provide, via the user interface, the user interaction data and the set of property information, the user interaction data allowing a user of the user interface to view at least one image of the interior portion of the property, the at least one image being based on the plurality of dimensions associated with the interior portion of the property and the image data associated with the interior portion of the property.

10. The computing device of claim 9, the one or more memories further including non-transitory computer executable instructions that when executed cause the one or more processors to generate the user interaction data to at least one of (i) allow the user to view at least one image corresponding to the interior portion of the property when the user indicates a selection of the interior portion of the property via the user interface, or (ii) allow the user to view (a) at least one image corresponding to the interior portion of the property and (b) an indication of the interior portion of the property.

11. The computing device of claim 9, the one or more memories further including non-transitory computer executable instructions that when executed cause the one or more processors to provide the image data associated with the interior portion of the property and an indication of the interior portion of the property to a contractor contacted by a party associated with the property regarding an improvement to the interior portion of the property.

12. The computing device of claim 9, the image data associated with the interior portion of the property being indicative of a condition of the interior portion of the property when the interior portion of the property has sustained a loss covered by an insurance provider, the one or more memories further including non-transitory computer executable instructions that when executed cause the one or more processors to provide the image data associated with the interior portion of the property to the insurance provider when the loss covered by the insurance provider is reported to the insurance provider.

13. The computing device of claim 9, the interior portion of the property being a first portion of the property and including a first level of the property, the plurality of dimensions associated with the first portion of the property and the image data associated with the first portion of the property being a first plurality of dimensions and first image data, the user interaction data being first user interaction data, the one or more memories further including non-transitory computer executable instructions that when executed cause the computing device to determine, using the image sensor, at least second image data associated with at least a second portion of the property, the one or more memories further including non-transitory computer executable instructions that when executed cause the one or more processors to:
  determine at least a second plurality of dimensions associated with the at least the second portion of the property;
  couple (i) each of the at least the second plurality of dimensions with (ii) a respective portion of the at least the second image data to generate second user interaction data associated with the at least the second portion of the property; and
  provide, via the user interface, the second user interaction data, the second user interaction data allowing the user to view at least one image of the at least the second portion of the property.

14. A sensor based property inspection computer readable storage medium comprising non-transitory computer readable instructions stored thereon for providing user interaction data associated with properties based on inputs received from corresponding users, wherein the instructions when executed by one or more computing devices cause the one or more computing devices to:
  determine, using a position sensor, a plurality of dimensions associated with an interior portion of a property;
  capture, using an image sensor, a plurality of images of the property, including at least (i) a first image of the interior portion of the property, and (ii) a second image of an exterior portion of the property;
  determine, using the image sensor, image data associated with at least the interior portion of the property, wherein the image data is determined based on the first image;
  determine a set of property information based on the second image, wherein the set of property information includes at least an identification of the property;
  couple (i) each of the plurality of dimensions associated with the interior portion of the property with (ii) a respective portion of the image data associated with the interior portion of the property to generate the user interaction data associated with the property;
  provide, by a user interface, a contractor communication option, the one or more processors, upon selection of the contractor communication option, configured to transmit (1) the image data associated with the interior portion of the property, (2) an indication of the interior portion of the property, and (3) the set of property information to a user device of a contractor, wherein the contractor corresponds to an improvement to the interior portion of the property; and
  provide, via the user interface, the user interaction data and the set of property information, the user interaction data allowing a user of the user interface to view at least one image of the interior portion of the property, the at least one image being based on the plurality of dimensions associated with the interior portion of the property and the image data associated with the interior portion of the property.

15. The computer readable storage medium of claim 14, further comprising non-transitory computer readable instructions stored thereon that when executed cause the one or more computing devices to generate the user interaction data to at least one of (i) allow the user to view at least one image corresponding to the interior portion of the property when the user indicates a selection of the interior portion of the property via the user interface, or (ii) allow the user to view (a) at least one image corresponding to the interior portion of the property and (b) an indication of the interior portion of the property.

16. The computer readable storage medium of claim 14, further comprising non-transitory computer readable instructions stored thereon that when executed cause the one or more computing devices to provide the image data associated with the interior portion of the property and an indication of the interior portion of the property to a contractor contacted by a party associated with the property regarding an improvement to the interior portion of the property.

17. The computer readable storage medium of claim 14, the image data associated with the interior portion of the property being indicative of a condition of the interior portion of the property when the interior portion of the property has sustained a loss covered by an insurance provider, the computer readable storage medium further comprising non-transitory computer readable instructions stored thereon that when executed cause the one or more computing devices to provide the image data associated with the interior portion of the property to the insurance provider when the loss covered by the insurance provider is reported to the insurance provider.

18. The computer readable storage medium of claim 14, the interior portion of the property being a first portion of the property and including a first level of the property, the plurality of dimensions associated with the first portion of the property and the image data associated with the first portion of the property being a first plurality of dimensions and first image data, the user interaction data being first user interaction data, the computer readable storage medium further comprising non-transitory computer readable instructions stored thereon that when executed cause the one or more computing devices to
  determine at least a second plurality of dimensions associated with at least a second portion of the property;

determine, using the image sensor, at least second image data associated with the at least the second portion of the property;

couple (i) each of the at least the second plurality of dimensions with (ii) a respective portion of the at least the second image data to generate second user interaction data associated with the at least the second portion of the property; and provide, via the user interface, the second user interaction data, the second user interaction data allowing the user to view at least one image of the at least the second portion of the property.

\* \* \* \* \*